United States Patent Office 2,830,997
Patented Apr. 15, 1958

2,830,997

ETHERS OF 3-PYRROLIDINOLS

Carl D. Lunsford, Richmond, Va., assignor to A. H. Robins Company, Inc., Richmond, Va., a corporation of Virginia No Drawing. Application May 17, 1956
Serial No. 585,382

8 Claims. (Cl. 260—326.5)

This invention relates to benzhydryl ethers of 3-pyrrolidinols and is more particularly concerned with benzhydryl ethers of N-substituted-3-pyrrolidinols, and their acid addition and quaternary salts.

The compounds of the present invention are benzhydryl ethers of 3-pyrrolidinols and fall structurally into the class of antihistamines or bronchodilator agents exemplified by beta-dimethylaminoethyl benzhydryl ether hydrochloride, known generically as diphenhydramine hydrochloride (Benadryl).

The prior art into which the present compounds fall is divergent and distinct from this invention. U. S. Patent 2,454,092 (Rieveschl) discloses in Example 4 the compound beta-pyrrolidinoethyl benzhydryl ether which illustrates type compounds where the etherification involves the N- or 1-position on the pyrrolidine fraction and in which additional methylene groups are present in the bridge. U. S. Patent 2,708,194 (Blicke) teaches pyrrolidylmethyl benzhydryl ether type compounds where the etherification involves the alpha- or 2-position on the pyrrolidine fraction and in which an additional methylene bridge group is present.

In contrast to the known prior art the present invention is directed to benzhydryl etherification of the beta- or 3-position of the pyrrolidine nucleus where the reaction occurs directly on the 3-pyrrolidinol.

Therefore, it is an object of this invention to provide novel benzhydryl ethers of 3-pyrrolidinol.

It is a further object of this invention to provide novel benzhydryl ethers of 3-pyrrolidinol wherein the 1- or N-position is substituted by a hydrocarbon radical.

It is a special object of this invention to provide novel compounds having antihistamine or bronchodilator activity.

These compounds by preliminary pharmacological tests on animals have been shown to have utility as antihistamine and bronchodilator agents.

The invention comprises a novel group of benzhydryl ethers of 3-pyrrolidinols, especially N-hydrocarbon radical substituted-3-pyrrolidinols. Substituted benzhydryl ethers of the N-substituted 3-pyrrolidinol series are also within the scope of the present invention. Preferably, the nitrogen atom in the pyrrolidine ring is substituted with a hydrocarbon radical, such as alkyl, cycloalkyl, aralkyl, aryl and the like. The term, benzhydryl, as used in this specification and appended claims, includes both the substituted and unsubstituted benzhydryl radicals. For example, such ring constituents as alkyl, halo, alkoxy and the like may be found in the ortho, meta, and para positions in one or both of the aromatic rings of the benzhydryl radical. Among the preferred benzhydryl ethers within the scope of the present invention are the benzhydryl ethers of the N-alkyl-3-pyrrolidinols, (1-alkyl-3-benzhydryloxypyrrolidines), the benzhydryl ethers of the N-cycloalkyl-3-pyrrolidinols, (1-cycloalkyl-3-benzhydryloxypyrrolidines), and the benzhydryl ethers of N-aralkyl-3-pyrrolidinols, (1-aralkyl-3-benzhydryloxypyrrolidines). Representative compounds are the 1-isopropyl-3-benzhydryloxypyrrolidine, 1-ethyl-3-benzhydryloxypyrrolidine, 1-ethyl-3-para-chlorobenzhydryloxypyrrolidine, 1-benzyl-3-benzhydryloxypyrrolidine, 1-cyclohexyl-3 - benzhydryloxypyrrolidine, 1 - methyl - 3 - para-methylbenzhydryloxypyrrolidine, 1-ethyl-3-para,para'-dimethoxybenzhydryloxypyrrolidine, and 1-ethyl-3-para-bromobenzhydryloxypyrrolidine.

In general the 1-substituted-3-benzhydryloxypyrrolidine compounds of the present invention are conveniently prepared by the condensation of a benzhydryl halide with the appropriate 1-substituted-3-pyrrolidinol in the presence of at least one equivalent of powdered, anhydrous alkali metal carbonate or excess pyrrolidinol as the condensing agent. The benzhydryl ethers produced which were generally oils were in some instances converted to crystalline, water soluble acid addition salts such as the hydrochloride by appropriate reaction with the acid. The perchlorate acid addition salts were generally very slightly water soluble.

The benzhydryl halides are well known starting materials.

Since many of the starting N-substituted-3-pyrrolidinols are themselves novel compounds, methods for their preparation are given in detail in the Preparations. The 1-substituted-3-pyrrolidinol amino alcohol starting materials may be conveniently prepared by a ring formation process using the corresponding dihalomonohydroxy alkanol and a primary amine similar to the method disclosed at 76 JACS 3548 (1954), as illustrated in Preparation 1.

PREPARATION 1.—1-N-BUTYL-3-PYRROLIDINOL

Into a 3-liter, round-bottom, three-neck flask fitted with a mechanical stirrer, condenser, dropping funnel and thermometer was introduced 731 grams (approximately 10 moles) of n-butylamine, and it was heated to reflux. The heating source was removed and 1155 grams (approximately 5 moles) of 1,4-dibromo-2-butanol was added dropwise, with stirring, at a rate which maintained refluxing of the amine. When the temperature of the mixture became 130–140 degrees centigrade it was maintained there by adjusting the rate of addition of the 1,4-dibromo-2-butanol and for an additional two hours by external heating after addition was complete. Approximately one liter of water was added to the reaction mixture, and the resulting solution was acidified with concentrated hydrochloric acid, cooled and extracted with ether. The aqueous layer was basified with 50 percent aqueous sodium hydroxide, saturated with potassium carbonate and extracted with chloroform. The chloroform solution was concentrated and the residue was fractionally distilled at reduced pressure; yield 440 grams (62 percent) of 1-n-butyl-3-pyrrolidinol; B. P. 120–124 degrees centigrade at 22 millimeters.

*Analysis.*—Calculated for $C_8H_{17}NO$: C, 67.09; H, 11.96. Found: C, 67.09; H, 12.11.

The 1,4-dibromo-2-butanol used in the preparation of the 1-substituted-3-pyrrolidinols is conveniently prepared according to the following procedure:

1,2,4-butanetriol (2120 grams, 20 moles) was heated in a three-liter, round-bottom, three-neck flask fitted with a gas inlet tube, thermometer and water separator to 120 degrees centigrade. A rapid stream of dry hydrogen bromide was passed in and the temperature was maintained at 130–140 degrees centigrade for approximately two hours until approximately 90 percent of the stoichiometric amount of water had separated. The remaining water was removed in vacuo and the residue distilled at reduced pressure; yield 3490 grams (75 percent); boiling range 153–160 degrees centigrade at 45 millimeters (98 degrees centigrade at 3.5 millimeters).

The substituted 3-pyrrolidinol starting materials may also be prepared by reduction of the corresponding ketones with suitable reducing agents, as illustrated in Preparations 2 and 3. The ketones per se are well known in the art, e. g., 73 JACS 2372 (1951) and are generally prepared by the Dieckmann cyclization reaction.

PREPARATION 2—1-N-BUTYL-3-PYRROLIDINOL

To illustrate this latter process wherein lithium aluminum hydride is employed for reduction, 1-n-butyl-3-pyrrolidone (16.0 grams, 0.113 mole) was added dropwise with stirring to a suspension of 3.0 grams (0.077 mole) of lithium aluminum hydride in 300 milliliters of dry ether The mixture was refluxed and stirred for 30 minutes after all ketone was added. The excess hydride was hydrolyzed with water and the mixture filtered. The ether filtrate was concentrated and distilled through a six inch Vigreux column. The 1-n-butyl-3-pyrrolidinol was collected at 138-139 degrees centigrade at 37 millimeters' pressure. Yield 13.0 grams, 0.091 mole (80.5 percent).

PREPARATION 3.—1-ETHYL-3-PYRROLIDINOL

To illustrate the use of sodium borohydride as the reducing agent for the preparation of the 3-pyrrolidinols, the 1-ethyl-3-pyrrolidone, resulting from the ring closure of 231 grams (1.0 mole) of beta-carbethyoxyethyl-carbethoxymethylethylamine with sodium ethoxide followed by acid hydrolysis and decarboxylation of the N-ethyl-pyrrolidone ester, was treated with a slight excess of sodium borohydride (0.28 mole) in aqueous solution near neutrality and allowed to stand at room temperature overnight. The complex was hydrolyzed with excess 50 percent sodium hydroxide and the pyrrolidinol was extracted into chloroform. The chloroform extract was concentrated and the 1-ethyl-3-pyrrolidinol was fractionated to give 27 grams (0.235 mole, 23.5 percent) of clear white oil, 1-ethyl-3-pyrrolidinol, boiling at 117-118 degrees centigrade at 39 millimeters' pressure.

The following examples illustrate the preparation of the 1-substituted-3-benzhydryloxypyrrolidines.

*Example 1.—1-methyl-3-benzhydryloxypyrrolidine*

A mixture of 40.5 grams (0.2 mole) of benzhydryl chloride, 20.2 grams (0.2 mole) of 1-methyl-3-pyrrolidinol, and 13.8 grams (0.1 mole) of anhydrous, powdered potassium carbonate was mechanically stirred in a dry atmosphere and heated to approximately 100° C. where the reaction became exothermic. The temperature of the mixture rose to 130-140° C. and was maintained there by cooling at first and then by heating for three hours. The resulting reaction mixture was partitioned between approximately 200 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, concentrated, and the residue fractionated at reduced pressure. Yield 21.0 grams (39.4%) of 1-methyl-3-benzhydryloxypyrrolidine; B. P. 146-150°C. at 0.3 mm.

The hydrochloride was prepared by treatment of an ethereal solution of the base with ethereal hydrogen chloride and crystallization from a methanol-butanone mixture; M. P. 151-163° C. This compound, 1-methyl-3-benzhydryloxypyrrolidine hydrochloride, was a white powder soluble in water. The molecular weight was 303.82.

*Analysis.*—Calculated for $C_{18}H_{21}NO.HCl$: 11.67% $Cl^-$. Found: 11.55% $Cl^-$.

*Example 2.—1-ethyl-3-benzhydryloxypyrrolidine*

A mixture of 101.3 grams (0.5 mole) of benzhydryl chloride, 57.5 grams (0.5 mole) of 1-ethyl-3-pyrrolidinol, and 48 grams (0.35 mole) of powdered, anhydrous potassium carbonate was mechanically stirred in a dry atmosphere and heated to approximately 100° C. where the reaction became exothermic. The temperature of the mixture rose to 130-140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, concentrated, and the residue fractionated at reduced pressure. Yield 81 grams (56%) of 1-ethyl-3-benzhydryloxypyrrolidine; B. P. 141-145° C. at 0.3 mm. The compound was a light yellow oil insoluble in water. The molecular weight was 281.38.

*Analysis.*—Calculated for $C_{19}H_{23}NO$: 4.98% N. Found: 5.02% N.

The perchlorate salt, 1-ethyl-3-benzhydryloxypyrrolidine perchlorate, was prepared by treatment of an absolute ethanolic solution of the base with one equivalent of 70 percent perchloricacid and recrystallization from the same solvent; M. P. 97-99° C. The solubility of the perchlorate salt in water was less than 1 percent but it was soluble in alcohol. In appearance it was a white powder with a molecular weight of 381.84.

*Analysis.*—Calculated for $C_{19}H_{23}NO.HClO_4$: 3.67. Found: 3.68.

*Example 3.—1-n-propyl-3-benzhydryloxypyrrolidine*

A mixture of 101.3 grams (0.5 mole of benzhydryl chloride, 64.55 grams (0.5 mole) of 1-n-propyl-3-pyrrolidinol, and 48 grams (0.35 mole) of powdered, anhydrous potassium carbonate was mechanically stirred in a dry atmosphere and heated to approximately 100° C. where the reaction became exothermic. The temperature of the mixture rose to 130-140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 67.5 grams (46%) of 1-n-propyl-3-benzhydryloxypyrrolidine; B. P. 146-150° C. at 0.3 mm. This benzhydryl ether was a yellow oil insoluble in water but soluble in propylene glycol and aqueous acid. The molecular weight was 295.41.

*Analysis.*—Calculated for $C_{20}H_{25}NO$: 4.74% N. Found: 4.76% N.

*Example 4.—1-iso-propyl-3-benzhydryloxypyrrolidine*

A mixture of 101.3 grams (0.5 mole) of benzhydryl chloride, 64.5 grams (0.5 mole) of 1-isopropyl-3-pyrrolidinol, and 46.5 grams (0.33 mole) of powdered, anhydrous potassium carbonate was mechanically stirred in a dry atmosphere and heated to approximately 100° C. where the reaction became exothermic. The temperature of the mixture rose to 130-140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 63 grams (43%) of 1-iso-propyl-3 - benzhydryloxypyrrolidine; B. P. 147—150° C. at 0.3 mm.

The hydrochloride, 1-iso-propyl-3-benzhydryloxypyrrolidine hydrochloride, was prepared by treatment of an ethereal solution of the base with ethereal hydrogen chloride and crystallization from an isopropyl alcohol-ether mixture; M. P. 138–141° C. This hydrochloride salt was a white powder fairly soluble in water (4–5%). The molecular weight was 331.88.

*Analysis.*—Calculated for $C_{20}H_{25}NO \cdot HCl$: 10.68%. Found: 10.87% $Cl^-$.

Example 5.—1-n-butyl-3-benzhydryloxypyrrolidine

A mixture of 101.3 grams (0.5 mole) of benzhydryl chloride, 71.6 grams (0.5 mole) of 1-n-butyl-3-pyrrolidinol, and 48 grams (0.35 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 82 grams (54%) of 1-n-butyl-3-benzhydryloxypyrrolidine; B. P. 150–155° C. at 0.3 mm. The compound was a pale yellow oil insoluble in water but soluble in propylene glycol and in aqueous acid. The molecular weight was 309.43.

*Analysis.*—Calculated for $C_{21}H_{27}NO$: 4.53% N. Found: 4.43% N.

Example 6.—1-iso-butyl-3-benzhydryloxypyrrolidine

A mixture of 98.4 grams (0.4 mole) of benzhydryl bromide, 57.2 grams (0.4 mole) of 1-isobutyl-3-pyrrolidinol, and 27.6 grams (0.2 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 400 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 67 grams (54%) of 1-iso-butyl-3-benzhydryloxypyrrolidine; B. P. 150–160° C. at 0.02 mm.

The hydrochloride, 1-iso-butyl-3-benzhydryloxypyrrolidine hydrochloride, was prepared by treatment of an ethereal solution of the base with ethereal hydrogen chloride and crystallization from butanone; M. P. 121–122° C. This salt was a white, crystalline powder soluble in water, alcohol and mixtures thereof but insoluble in nonpolar solvents. The molecular weight was 346.90.

*Analysis.*—Calculated for $C_{12}H_{27}NO \cdot HCl$: 10.25% $Cl^-$. Found: 10.20% $Cl^-$.

Example 7.—1-tert-butyl-3-benzhydryloxypyrrolidine

A mixture of 49.4 grams (0.2 mole) of benzhydryl bromide, 28.6 grams (0.2 mole) of 1-tert-butyl-3-pyrrolidinol, and 13.8 grams (0.1 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 200 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 29 grams (47%) of 1-tert-butyl-3-benzhydryloxypyrrolidine; B. P. 152–155° C. at 0.02 mm.

The hydrochloride, 1-tert-butyl-3-benzhydryloxypyrrolidine hydrochloride, was prepared by treatment of an ethereal solution of the base with ethereal hydrogen chloride and crystallization from butanone; M. P. 183–185° C. This compound was a white, crystalline powder soluble in water, alcohol and mixtures of the two and insoluble in non-polar solvents. The molecular weight was 346.90.

*Analysis.*—Calculated for $C_{21}H_{27}NO \cdot HCl$: 10.25% $Cl^-$. Found: 10.22% $Cl^-$.

Example 8.—1-cyclohexyl-3-benzhydryloxypyrrolidine

A mixture of 101.3 grams (0.5 mole) of benzhydryl chloride, 85.6 grams (0.5 mole) of 1-cyclohexyl-3-pyrrolidinol, and 48 grams (0.35 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first, then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 84 grams (50%) of 1-cyclohexyl-3-benzhydryloxypyrrolidine; B. P. 183–185° C. at 0.2 mm. This benzhydryl ether was a pale yellow waxy crystalline substance insoluble in water but soluble in aqueous acid and propylene glycol. The molecular weight was 335.47.

*Analysis.*—Calculated for $C_{23}H_{29}NO$: 4.18% N. Found: 3.94% N.

Example 9.—1-benzyl-3-benzhydryloxypyrrolidine

A mixture of 73 grams (0.37 mole) of benzhydryl chloride, 65 grams (0.37 mole) of 1-benzyl-3-pyrrolidinol, and 44 grams (0.32 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 400 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 76 grams (44%) of 1-benzyl-3-benzhydryloxypyrrolidine; B. P. 190–192° C. at 0.2 mm. This compound was a heavy yellow oil insoluble in water (1%) but soluble in alcohol and in propylene glycol. The molecular weight was 343.45.

*Analysis.*—Calculated for $C_{24}H_{25}NO$: 4.08% N. Found: 4.12% N.

The perchlorate salt, 1-benzyl-3-benzhydryloxypyrrolidine perchlorate, was prepared by treatment of an absolute ethanolic solution of the base with one equivalent of 70 percent perchloric acid and recrystallization from the same solvent; M. P. 130–131° C. This compound was a white powder insoluble in water and propylene glycol. The molecular weight was 443.91.

Analysis.—Calculated for $C_{24}H_{25}NO \cdot HClO_4$: 3.16% N. Found: 3.10% N.

Example 10.—1-methyl-3-p-chlorobenzhydryloxy-pyrrolidine

A mixture of 118.5 grams (0.5 mole) of p-chlorobenzhydryl chloride, 50.6 grams (0.5 mole) of 1-methyl-3-pyrrolidinol, and 39 grams (0.28 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 75.5 grams (50%) of 1-methyl-3-p-chlorobenzhydryloxypyrrolidine; B. P. 162–167° C. at 0.3 mm. This benzhydryl ether was a light yellow oil soluble in propylene glycol and slightly soluble in dilute acids. The molecular weight was 301.81.

Analysis.—Calculated for $C_{18}H_{20}ClNO$: 4.64% N. Found: 4.83% N.

An ethereal solution of the base was acidified with ethereal hydrogen chloride and cooled in an ice-bath, and the solvent was decanted from the oil which separated. This oil was crystallized from a saturated ethyl acetate solution by cooling overnight at 10° C.; M. P. 123–123.5° C. The resulting hydrochloride salt compound 1-methyl-3-p-chlorobenzhydryloxypyrrolidine hydrochloride was found to have the following analysis.

Analysis.—Calculated for $C_{18}H_{20}ClNO \cdot HCl$: 10.48% $Cl^-$. Found: 10.54% $Cl^-$.

In appearance the HCl salt was a white powder with a molecular weight of 338.27 and a melting point of 123–123.5° C. which was soluble in water.

Example 11.—1-ethyl-3-p-chlorobenzhydryloxypyrrolidine

A mixture of 118.5 grams (0.5 mole) of p-chlorobenzhydryl chloride, 57.5 grams (0.5 mole) of 1-ethyl-3-pyrrolidinol, and 35.8 grams (0.26 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 79 grams (50%) of 1-ethyl-3-p-chlorobenzhydryloxypyrrolidine; B. P. 160–162° C. at 0.15 mm.

The hydrochloride, 1-ethyl-3-chlorobenzhydryloxypyrrolidine hydrochloride, was prepared by treatment of an ethereal solution of the base with ethereal hydrogen chloride and crystallization from a butanone-ether mixture and from ethyl acetate; M. P. 145–146° C. This salt was a white powder soluble in water and alcohol but insoluble in nonpolar solvents. The molecular weight was 352.30.

Analysis.—Calculated for $C_{19}H_{22}ClNO \cdot HCl$: 10.70% $Cl^-$. Found: 9.99% $Cl^-$.

Example 12.—1-n-propyl-3-p-chlorobenzhydryloxy-pyrrolidine

A mixture of 118.5 grams (0.5 mole) of p-chlorobenzhydryl chloride, 65 grams (0.5 mole) of 1-n-propyl-3-pyrrolidinol, and 34.6 grams (0.25 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 70.5 grams (45%) of 1-n-propyl-3-p-chlorobenzhydryloxypyrrolidine; B. P. 160° C. at 0.3 mm.

The hydrochloride was prepared by treatment of an ethereal solution of the base with ethereal hydrogen chloride and crystallization from a butanone-ether mixture; M. P. 135–137° C. The salt, 1-n-propyl-3-p-chlorobenzhydryloxypyrrolidine hydrochloride, was a white powder soluble in water and alcohol but insoluble in nonpolar solvents. The molecular weight was 366.33.

Analysis.—Calculated for $C_{20}H_{24}ClNO \cdot HCl$: 9.68% $Cl^-$. Found: 9.51% $Cl^-$.

Example 13.—1-iso-propyl-3-p-chlorobenzhydryloxy-pyrrolidine

A mixture of 118.5 grams (0.5 mole) of p-chlorobenzhydryl chloride, 65 grams (0.5 mole) of 1-iso-propyl-3-pyrrolidinol, and 35.8 grams (0.26 mole) of powdered, anhydrous potassium carbonate was mechanically stirred in a dry atmosphere and heated to approximately 100° C. where the reaction become exothermic. The temperature of the mixture rose to 130–140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 83 grams (50%) of 1-iso-propyl-3-p-chlorobenzhydryloxypyrrolidine; B. P. 160–164° C. at 0.07 mm.

The hydrochloride was prepared by treatment of an ethereal solution of the base with ethereal hydrogen chloride and crystallization from butanone; M. P. 143°–145° C. The hydrochloride, 1-iso-propyl-3-p-chlorobenzhydryloxypyrrolidine hydrochloride, was a white powder soluble in water and alcohol but insoluble in nonpolar solvents. The molecular weight was 366.33.

Analysis.—Calculated for $C_{20}H_{24}ClNO \cdot HCl$: 9.68% $Cl^-$. Found: 9.75% $Cl^-$.

Example 14.—1-n-butyl-3-p-chlorobenzhydryloxy-pyrrolidine

A mixture of 118.5 grams (0.5 mole) of p-chlorobenzhydryl chloride, 71.6 grams (0.5 mole) of 1-n-butyl-3-pyrrolidinol, and 35.8 grams (0.26 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 55 ml. each of 10 percent aqueous sodium hydroxide and ether. The ethereal extract was washed with water, dried over sodium sulfate, and concentrated; and the residue was fractionated at reduced pressure. Yield 84 grams (50%); B. P. 176–179° C. at 0.3 mm. The compound, 1-n-butyl-3-p-chlorobenzhydryloxypyrrolidine, was a pale yellow oil soluble in propylene glycol and slightly soluble in dilute acid. The molecular weight was 343.88.

Analysis.—Calculated for $C_{21}H_{26}ClNO$: 4.07% N. Found: 4.11% N.

*Example 15.—1-iso-butyl-3-p-chlorobenzhydryloxypyrrolidine*

A mixture of 118.5 grams (0.05 mole) of p-chlorobenzhydryl chloride, 72 grams (0.5 mole) of 1-isobutyl-3-pyrrolidinol, and 34.6 grams (0.25 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 67 grams (39%) of 1-iso-butyl-3-p-chlorobenzhydryloxypyrrolidine; B. P. 167° C. at 0.05 mm.

The hydrochloride was prepared by treatment of an ethereal solution of the base with ethereal hydrogen chloride and crystallization from a butanone-ether mixture; M. P. 135–137° C. This compound, 1-iso-butyl-3-p-chlorobenzhydryloxypyrrolidine hydrochloride, was a white powder soluble in water and alcohol but insoluble in nonpolar solvents. The molecular weight was 380.35.

Analysis.—Calculated for $C_{21}H_{26}ClNO \cdot HCl$: 9.32% $Cl^-$. Found: 9.27% $Cl^-$.

*Example 16.—1-tert-butyl-3-p-chlorobenzhydryloxypyrrolidine*

A mixture of 118.5 grams (0.5 mole) of p-chlorobenzhydryl chloride, 72 grams (0.5 mole) of 1-tert-butyl-3-pyrrolidinol, and 35.8 grams (0.26 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling first and then by heating for three hours. The resulting reaction mixture was partitioned between approximately 500 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 124 grams (73%) of 1-tert-butyl-3-p-chlorobenzhydryloxypyrrolidine; B. P. 158–160° C. at 0.1 mm. This benzhydryl ether was a pale yellow oil soluble in propylene glycol and slightly soluble in aqueous acids. The molecular weight was 343.88.

Analysis.—Calculated for $C_{21}H_{26}ClNO$: 4.07% N. Found: 4.11% N.

*Example 17.—1-cyclohexyl-3-p-chlorobenzhydryloxypyrrolidine*

A mixture of 71 grams (0.3 mole) of p-chloro-benzhydryl chloride, 51 grams (0.3 mole) of 1-cyclohexyl-3-pyrrolidinol, and 27.6 grams (0.2 mole) of powdered, anhydrous potassium carbonate was mechanically stirred in a dry atmosphere and heated to approximately 100° C. where the reaction became exothermic. The temperature of the mixture rose to 130–140° C. and was maintained there by cooling at first and then by heating for three hours. The resulting reaction mixture was partitioned between approximately 300 ml. each of 10 percent aqueous sodium hydroxide and ether. The ethereal layer was extracted with 5 percent hydrochloric acid, and the acid extract was basified with concentrated aqueous sodium hydroxide and extracted with ether. The ethereal extract was washed with water, dried over sodium sulfate, and concentrated; and the residue was fractionated at reduced pressure. Yield 68 grams (62%) of 1-cyclohexyl-3-p-chlorobenzhydryloxypyrrolidine; B. P. 192–194° C. at 0.6 mm. This benzhydryl ether was an amber oil insoluble in dilute acids but soluble in propylene glycol. The molecular weight was 370.92.

Analysis:—Calculated for $C_{23}H_{28}ClNO$: 3.78% N. Found: 3.89% N.

*Example 18.—1-benzyl-3-p-chlorobenzhydryloxypyrrolidine*

This synthesis was different from the general procedure outline for the foregoing examples in that excess pyrrolidinol was used as the condensing agent instead of potassium carbonate.

p-Chlorobenzhydryl chloride (71.5 grams (0.3 mole)) was added dropwise with stirring to 110 grams (0.62 mole) of 1-benzyl-3-pyrrolidinol which was previously heated to 100° C. The temperature increased to 160° C. where it was maintained for four hours. The resulting reaction mixture was partitioned between approximately 500 ml. each of 10 percent aqueous sodium hydroxide and ether. The ethereal layer was extracted with 5 percent hydrochloric acid and the acid extract was basified with concentrated aqueous sodium hydroxide and extracted with ether. The ethereal extract was washed with water, dried over sodium sulfate and concentrated; and the residue was fractionated at reduced pressure. There was 55 percent recovery of the 1-benzyl-3-pyrrolidinol. Yield 69.5 grams (68%) of 1-benzyl-3-p-chlorobenzhydryloxypyrrolidine; B. P. 201–204° C. at 0.05 mm. This compound was a viscid yellow oil insoluble in water and dilute acids but soluble in alcohol and propylene glycol. The molecular weight was 377.90.

Analysis:—Calculated for $C_{24}H_{24}ClNO$: 3.71% N. Found: 4.05% N.

*Example 19.—1-ethyl-3-p-bromobenzhydryloxypyrrolidine*

A mixture of 29.5 grams (0.105 mole) of p-bromobenzhydryl chloride and 29.0 grams (0.25 mole) of 1-ethyl-3-pyrrolidinol was heated to 140° C. while stirring and maintained at this temperature for four hours. The resulting reaction mixture was partitioned between 25 percent aqueous sodium hydroxide and ether. The ethereal layer was extracted with 6 N hydrochloric acid and the acid extract was basified with concentrated aqueous sodium hydroxide and extracted with ether. This ethereal extract was washed with water, dried over sodium sulfate and concentrated; and the residue was fractionated at reduced pressure. Yield 18.5 grams (52%) of 1-ethyl-3-p-bromobenzhydryloxypyrrolidine; B. P. 170–173° C. at 0.15 mm. The material was redistilled at 145° C. and 0.005 mm. pressure.

Analysis.—Calculated for $C_{19}H_{22}BrNO$: C, 63.34; H, 6.16. Found: C, 63.62; H, 6.08.

*Example 20.—1-ethyl-3-p,p'-dimethoxybenzhydryloxypyrrolidine*

A mixture of 24.0 grams (0.092 mole) of p,p'-dimethoxybenzhydryl chloride and 24.5 grams (0.23 mole) of 1-ethyl-3-pyrrolidinol was heated to 140° C. while stirring and maintained at this temperature for four hours. The resulting reaction mixture was partitioned between 25 percent aqueous sodium hydroxide and ether. The ethereal layer was extracted with 6 N hydrochloric acid and the acid extract was basified with concentrated aqueous sodium hydroxide and extracted with ether. This ethereal extract was washed with water, dried over sodium sulfate and concentrated; and the residue was fractionated at reduced pressure. Yield 21.0 grams (67%) of 1-ethyl-3 - p,p' - dimethoxybenzhydryloxypyrrolidine; B. P. 190–200° C. at 0.4 mm. The material was redistilled at 162–165° C. and 0.001 mm. pressure.

Analysis.—Calculated for $C_{21}H_{27}NO_3$: C, 73.87; H, 7.97. Found: C, 74.01; H, 7.94.

Example 21.—1-methyl-3-p-methylbenzhydryloxypyrrolidine

A mixture of 28.4 grams (0.13 mole) of p-methylbenzhydryl chloride and 36.0 grams (0.35 mole) of 1-methyl-3-pyrrolidinol was heated to 140° C. while stirring and maintained at this temperature for four hours. The resulting reaction mixture was partitioned between 25 percent aqueous sodium hydroxide and ether. The ethereal layer was extracted with 6 N hydrochloric acid and the acid extract was basified with concentrated aqueous sodium hydroxide and extracted with ether. This ethereal extract was washed with water, dried over sodium sulfate and concentrated; and the residue was fractionated at reduced pressure. Yield 26 grams (70.6%) of 1-methyl-3-p-methylbenzhydryloxypyrrolidine; B. P. 153–157° C. at 0.15 mm. This material was redistilled at 134–135° C. and 0.002 mm. pressure.

Analysis.—Calculated for $C_{19}H_{23}NO$: C, 81.02; H, 8.24. Found: C, 81.07; H, 8.15.

Members of this group of compounds have been tested in mice for acute toxicity where evaluation of $LD_{50}$'s was made by the method of Litchfield and Wilcoxon, 96 J. Pharmacol and Exp. Therap. 99 (1949). These compounds were also tested for antihistamine and bronchodilator activity and screened by guinea pig tests using the method of Castillo and De Beer, 90 J. Pharmacol and Exp. Therap. 104 (1947). This technique in the screening measured the spasmolytic effect of the compound which was induced in one test by histamine phosphate and another test by egg white. The acute toxicity tests were satisfactory and the compounds exhibited antihistamine and bronchodilator activity. The activity of several of the compounds measured by the amount of relaxation of the contracted isolated guinea pig trachea was rated excellent by comparative response.

Various modifications may be made in the compounds of the present invention and it is to be understood that the invention is only to be limited to the scope of the appended claims.

I claim:
1. Benzhydryl ether of a N-hydrocarbon radical substituted 3-pyrrolidinol in which the hydrocarbon radical is selected from a group consisting of lower alkyl, cyclohexyl and benzyl.
2. Benzhydryl ether of a N-lower alkyl-3-pyrrolidinol.
3. 1-ethyl-3-benzhydryloxypyrrolidine.
4. 1-ethyl-3-para-chlorobenzhydryloxypyrrolidine hydrochloride.
5. 1 - iso-butyl-3-para-chlorobenzhydryloxypyrrolidine hydrochloride.
6. 1-iso-propyl-3-para-chlorobenzhydryloxypyrrolidine hydrochloride.
7. 1-methyl-3-p-chlorobenzhydryloxypyrrolidine hydrochloride.
8. A hydro halide acid addition salt of benzhydryl ether of N-lower alkyl-3-pyrrolidinol.

References Cited in the file of this patent
UNITED STATES PATENTS

| | | |
|---|---|---|
| 2,708,194 | Blicke | May 10, 1955 |
| 2,716,122 | Levy et al. | Aug. 23, 1955 |